(12) United States Patent
Cheong et al.

(10) Patent No.: US 12,288,888 B2
(45) Date of Patent: Apr. 29, 2025

(54) BATTERY MODULE

(71) Applicant: SK INNOVATION CO., LTD., Seoul (KR)

(72) Inventors: Hoemin Cheong, Daejeon (KR); Ho Yeon Kim, Daejeon (KR); Gyu Jin Chung, Daejeon (KR)

(73) Assignee: SK ON CO., LTD., Seoul (KR)

(*) Notice: Subject to any disclaimer, the term of this patent is extended or adjusted under 35 U.S.C. 154(b) by 55 days.

(21) Appl. No.: 17/584,121

(22) Filed: Jan. 25, 2022

(65) Prior Publication Data

US 2022/0238948 A1  Jul. 28, 2022

(30) Foreign Application Priority Data

Jan. 25, 2021 (KR) .......................... 10-2021-0009912

(51) Int. Cl.
*H01M 50/191* (2021.01)
*B23K 26/21* (2014.01)
*H01M 50/169* (2021.01)
*H01M 50/209* (2021.01)
*H01M 50/211* (2021.01)
(Continued)

(52) U.S. Cl.
CPC ........... *H01M 50/191* (2021.01); *B23K 26/21* (2015.10); *H01M 50/169* (2021.01); *H01M 50/209* (2021.01); *H01M 50/211* (2021.01); *H01M 50/224* (2021.01); *H01M 50/242* (2021.01);
(Continued)

(58) Field of Classification Search
CPC ........... H01M 50/20–224; H01M 50/233–244; H01M 50/249; H01M 50/271–276; H01M 50/10–298
See application file for complete search history.

(56) References Cited

U.S. PATENT DOCUMENTS 6,204,469 B1  3/2001  Fields, Jr. et al.
6,745,929 B1  6/2004  Ezumi et al.
(Continued)

FOREIGN PATENT DOCUMENTS

CA      2242139 A1 * 12/1999  ......... B23K 26/0608
CN    106299175 A  *  1/2017  .......... H01M 2/1077
(Continued)

OTHER PUBLICATIONS

Machine translation of Sawada, JP-2003142050-A. Originally available May 16, 2003. (Year: 2003).*
(Continued)

*Primary Examiner* — Jonathan Crepeau
*Assistant Examiner* — Jacob Buchanan
(74) *Attorney, Agent, or Firm* — IP & T GROUP LLP

(57) ABSTRACT

The present invention relates to a battery module. The battery module according to the present invention includes a housing having an internal accommodation space; and a plurality of battery cells disposed in the internal accommodation space, in which the housing includes a weld joint in which a first base material of a first aluminum-based alloy and a second base material of a second aluminum-based alloy are welded, and at least a partial region of a bead surface of the weld joint is located inward with respect to a reference plane, with an imaginary plane, which connects an outer surface of the first base material and an outer surface of the second base material in contact with the weld joint, as the reference plane.

17 Claims, 7 Drawing Sheets

(51) Int. Cl.
  *H01M 50/224* (2021.01)
  *H01M 50/242* (2021.01)
  *H01M 50/276* (2021.01)
  *B23K 101/36* (2006.01)

(52) U.S. Cl.
  CPC ....... *H01M 50/276* (2021.01); *B23K 2101/36* (2018.08)

(56) References Cited

U.S. PATENT DOCUMENTS

| | | | | |
|---|---|---|---|---|
| 2010/0028759 A1* | 2/2010 | Ebine | ................. | H01M 50/188 |
| | | | | 429/163 |
| 2019/0299333 A1* | 10/2019 | Kokume | ................ | B23K 26/26 |
| 2022/0052391 A1* | 2/2022 | Kim | ..................... | H01M 50/211 |

FOREIGN PATENT DOCUMENTS

| | | | | |
|---|---|---|---|---|
| EP | 0722804 A2 * | 1/1996 | ........... | B23K 9/0026 |
| JP | H1-115052 A | 5/1989 | | |
| JP | H08315789 A * | 11/1996 | ............. | Y02E 60/10 |
| JP | 11104866 A * | 4/1999 | ........... | B23K 23/206 |
| JP | H11-250871 A | 9/1999 | | |
| JP | 2003142050 A * | 5/2003 | ............ | H01M 10/61 |
| JP | 2006324160 A * | 11/2006 | .............. | Y02P 70/50 |
| JP | 2013-143332 A | 7/2013 | | |
| JP | 2014102895 A * | 6/2014 | .............. | Y02E 60/10 |
| KR | 10-0631404 B1 | 10/2006 | | |
| KR | 10-2013-0127815 A | 11/2013 | | |
| KR | 10-2018-0023976 A | 3/2018 | | |
| WO | WO-2020251176 A1 * | 12/2020 | ............ | H01M 10/61 |

OTHER PUBLICATIONS

Machine translation of Zhao, CN-106299175-A. Originally available Jan. 4, 2017. (Year: 2017).*
Machine translation of Nakamura, JP H08315789. Originally available Nov. 29, 1996. (Year: 1996).*
Machine translation of Jogan, JP-11104866. Originally available Apr. 20, 1999. (Year: 1999).*
Machine translation of Hashimoto, JP 2006324160. Originally available Nov. 30, 2006. (Year: 2006).*
Machine translation of Okuda, JP 2014102895. Originally available Jun. 5, 2014. (Year: 2014).*
Extended European Search Report for the European Patent Application No. 22153328.4 issued by the European Patent Office on Jun. 21, 2022.

\* cited by examiner

[FIG. 1]
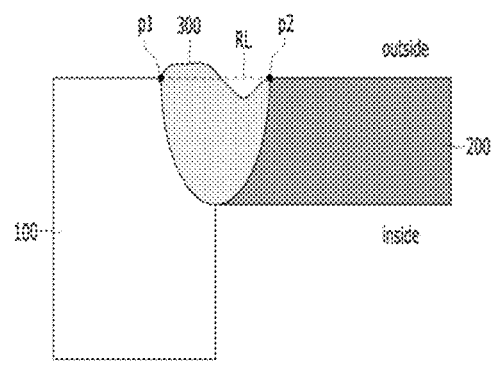
[FIG. 2]
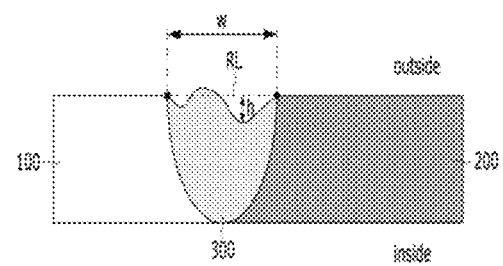

[FIG. 3]
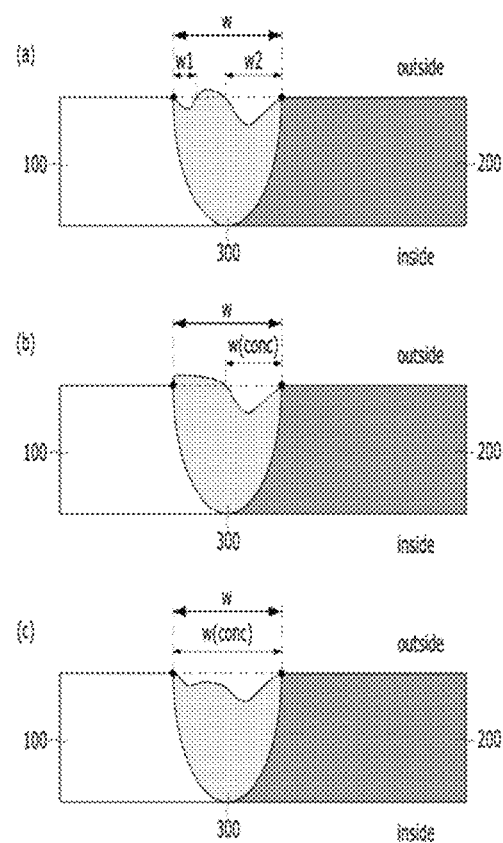

[FIG. 4]
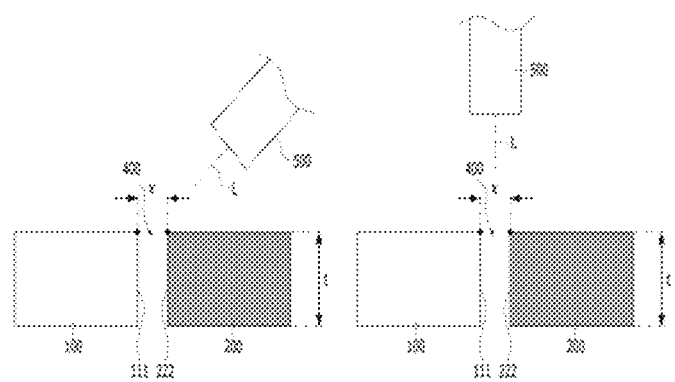

[FIG. 5]
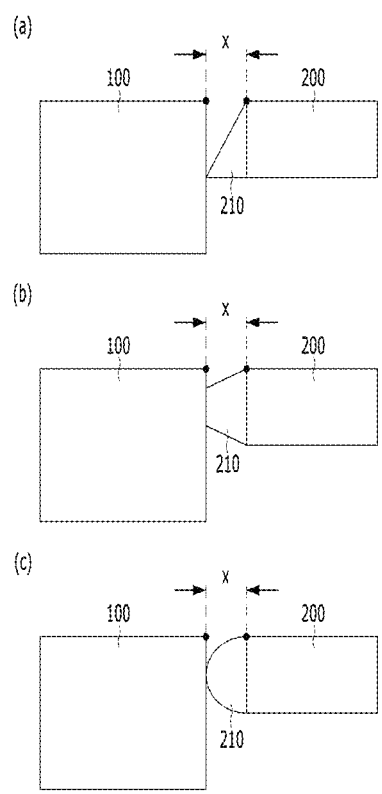

[FIG. 6]
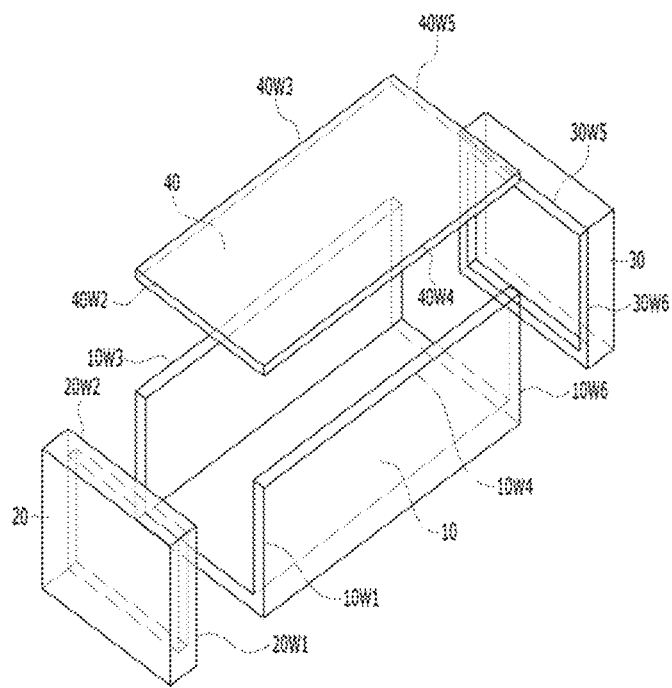

[FIG. 7]
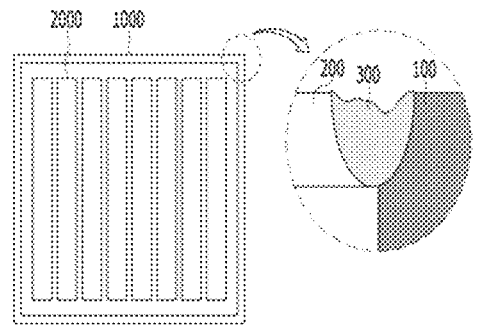
[FIG. 8]
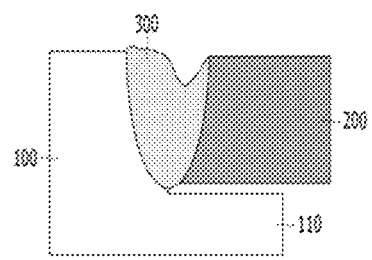
[FIG. 9]
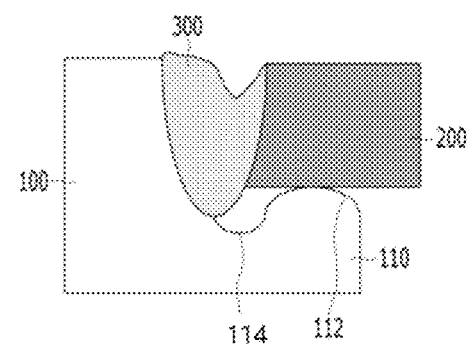

[FIG. 10]
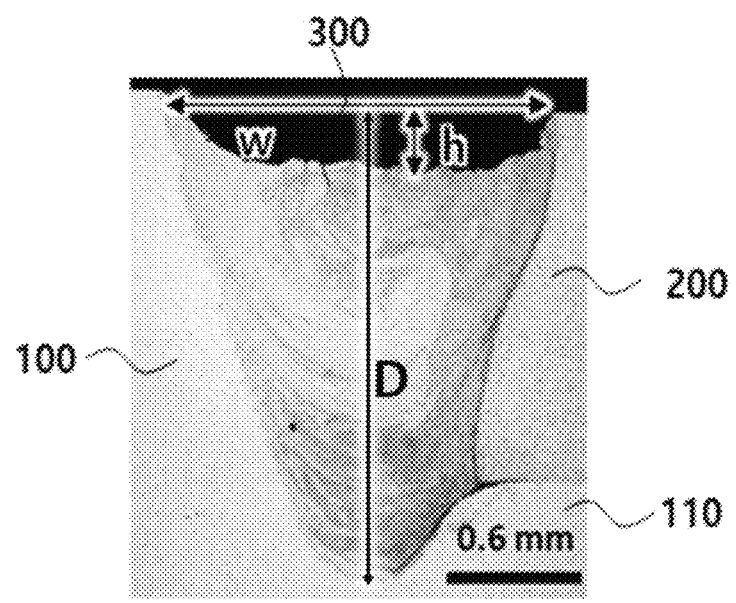

BATTERY MODULE

CROSS-REFERENCE TO RELATED APPLICATIONS

This application claims priority under 35 U.S.C. § 119 to Korean Patent Application No. 10-2021-0009912, filed on Jan. 25, 2021, in the Korean Intellectual Property Office, the disclosure of which is incorporated herein by reference in its entirety.

TECHNICAL FIELD

The following disclosure relates to a battery module, and more particularly, to a battery module having improved welding strength and durability.

BACKGROUND ART

A module housing has a structure in which housing members that may be assembled and joined to form a sealed internal accommodation space are joined to each other by laser welding, in which pouch-type or prismatic battery cells connected in series/parallel to each other are located in the internal accommodation space.

However, when an external shock is applied to the housing, a connection part (welded site) between the housing members does not have high resistance to the external shock, and thus, is easily damaged and a sealing property is lowered, so there is a risk that harmful substances that may be generated from battery cells are leaking out and there is a problem in that, during a coupling process between the housing members, a precise adhesion setting is required, resulting in defects due to process errors and lowering productivity.

RELATED ART DOCUMENT

Patent Document

Korean Patent Laid-Open Publication No. 10-2013-0127815

DISCLOSURE

Technical Problem

An embodiment of the present invention is directed to providing a battery module having improved welding strength and durability.

Technical Solution

In one general aspect, a battery module includes a housing having an internal accommodation space; and a plurality of battery cells disposed in the internal accommodation space, in which the housing includes a weld joint in which a first base material of a first aluminum-based alloy and a second base material of a second aluminum-based alloy are welded, and at least a partial region of a surface of a bead of the weld joint is located inward with respect to a reference plane, with an imaginary plane, which connects an outer surface of the first base material and an outer surface of the second base material in contact with the weld joint, as the reference plane.

With respect to the weld cross-section, which is a cross-section traversing the weld joint at a shortest distance from the first base material side to the second base material side, the weld joint may satisfy the following Equation 1.

$$0.10 \leq h/w \leq 0.30 \quad \text{(Equation 1)}$$

In Equation 1, w denotes a size of a straight line (reference line corresponding to a welding width) connecting a boundary between the outer surface of the first base material and the weld joint in the weld cross-section and a boundary between the outer surface of the second base material and the weld joint, and h denotes a shortest distance between a lowest point in a region of the surface of the bead located inward with respect to the straight line (reference line) on the weld cross-section and the straight line (reference line).

With respect to the weld cross-section, which is a cross-section traversing the weld joint at a shortest distance from the first base material side to the second base material side, the weld joint may satisfy the following Equation 2.

$$0.2 \leq w(conc)/w \leq 1.0 \quad \text{(Equation 2)}$$

In Equation 2, w denotes a size of a straight line (reference line corresponding to a welding width) connecting a boundary between the outer surface of the first base material and the weld joint in the weld cross-section and a boundary between the outer surface of the second base material and the weld joint, and w(conc) denotes a total length of a sum of lengths of a straight region of the straight line where the surface of the weld bead is located at a lower portion of the straight line (reference line).

The first base material and the second base material may each have a shape of a rectangular plate or a bent rectangular plate in which one or both ends are vertically bent.

With respect to the weld cross-section, which is a cross-section traversing the weld joint at a shortest distance from the first base material side to the second base material side, the weld joint may satisfy the following Equation 1.

$$0.7t \leq w \leq 2t \quad \text{(Equation 3)}$$

In Equation 3, w denotes a size of a straight line (reference line corresponding to a welding width) connecting a boundary between the outer surface of the first base material and the weld joint in the weld cross-section and a boundary between the outer surface of the second base material and the weld join, and t denotes the thinner of thicknesses of the first base material and the second base material.

With respect to the weld cross-section, which is across-section traversing the weld joint at a shortest distance from the first base material side to the second base material side, the weld joint may satisfy the following Equation 2.

$$0 < h \leq 0.25t \quad \text{(Equation 4)}$$

In Equation 4, h denotes a shortest distance between a straight line (reference line corresponding to a welding width) a boundary between the outer surface of the first base material and the weld joint in the weld cross-section and a boundary between the outer surface of the second base material and the weld joint and a lowest point in a region of the surface of the bead located inward with respect to the straight line (reference line) on the weld cross-section, and t denotes the thinner of thicknesses of the first base material and the second base material.

A penetration depth of the bead of metal molten in the weld joint may be greater than or equal to the thinner of thicknesses of the first base material and the second base material each having a shape of a rectangular plate or a bent rectangular plate.

The outer surface of the first base material and the outer surface of the second base material may be located on the same plane.

The first base material may further include a rib that protrudes toward the second base material and is entirely or at least partially spaced apart from an opposite surface of the outer surface of the second base material, with a thicker base material among the first base material and the second base material as the first base material.

In the rib, a surface facing the opposite surface of the second base material may be a curved surface, and the curved surface may include a concave surface located on a welding surface side of the first base material and a convex surface located on an opposite side of the welding surface side.

The rib may be in contact with the second base material on the convex surface, and the bead may fill a part or all of a hollow space between the opposite surface of the outer surface of the second base material and the concave surface of the rib.

The housing may include a first housing member in a shape of a bent rectangular plate including a bottom surface and integrally connected to the bottom surface to form left/right side surfaces; a second housing member having a rectangular plate shape coupled to the first housing member to form an upper surface facing the bottom surface; and third and fourth housing members in a shape of a rectangular plate which are coupled to the first and second housing members to form front and rear two side surfaces, and a pair of the first base material and the second base material connected to each other by the weld joint may be at least one selected from the following i) to v).

i) First housing member-second housing member
ii) First housing member-third housing member
iii) First housing member-fourth housing member
iv) First housing member welded to the third and fourth housing members-second housing member
v) First housing member welded to the second and third housing members-fourth housing member The first aluminum-based alloy and the second aluminum-based alloy may be independent of each other and may be an Al—Mg-based solid-solution hardening aluminum alloy or an Al—Mg—Si-based precipitation hardening aluminum alloy.

The present invention includes a method of manufacturing the above-described battery module.

In another aspect, a method of manufacturing a battery module includes a) aligning a first base material and a second base material so that welding surfaces of the first base material and the second base material which are welding targets and are coupled to each other to form a housing member forming an internal accommodation space in which a plurality of battery cells are accommodated are spaced apart from each other to form a gap, and b) welding the first base material and the second base material by irradiating a laser to a welded site where the gap is formed.

In step a), a size x of the gap may be greater than 0 and less than or equal to 0.3t, based on t which is the thinner of thicknesses of the first base material and the second base material.

A welded end of the second base material may include a protrusion protruding in a tapered shape that becomes narrower as the welded end approaches the first base material, wherein the first base material is thinner than the second base material.

The protrusion may have a shape of a polygon including a rectangle or a triangle, a semicircle, or a truncated oval, with respect to a cross-section that traverses the welded site at a shortest distance from the first base material side to the second base material side.

The laser may be a near-infrared laser.

A ratio of the irradiated laser power (W) divided by a welding speed (mm/sec) may be 30 to 45 J/mm.

A method of manufacturing a battery module includes positioning a welding surface of a first base material with a welding surface of a second base material to be adjacent to each other but spaced apart with a gap formed therebetween; and welding the first and second base materials by irradiating a laser to form a housing for a plurality of battery cells.

Advantageous Effects

A battery module according to the present invention has the advantage of having improved mechanical properties due to a controlled shape of a weld joint.

In addition, a battery module according to the present invention may reduce a heat-affected portion of a base material and may suppress a deterioration of the base material as a shape of a weld joint controlled by a lower energy laser irradiation is implemented.

In addition, a battery module according to the present invention has a large allowable tolerance range when manufacturing a housing member or assembling the housing member, thereby making it easy to maintain quality and improve productivity.

DESCRIPTION OF DRAWINGS

FIG. 1 is a cross-sectional view illustrating a weld cross-section in a battery module according to an embodiment of the present invention.

FIG. 2 is another cross-sectional view illustrating the weld cross-section in the battery module according to an embodiment of the present invention.

FIG. 3 includes cross-sectional views (a), (b) and (c) illustrating a weld cross-section in the battery module according to embodiments of the present invention.

FIG. 4 is one process diagram illustrating a welding process between housing members in the battery module according to an embodiment of the present invention.

FIG. 5 includes process diagrams (a), (b), and c) illustrating an alignment between two housing members and members to be welded in the battery module according to embodiments of the present invention.

FIG. 6 is an exploded perspective view of housing members that are coupled by welding to form a housing in the battery module according to an embodiment of the present invention.

FIG. 7 is a cross-sectional view of a battery module that includes a housing and a plurality of battery cells accommodated in an internal accommodation space of the housing in the battery module according to an embodiment of the present invention.

FIG. 8 is another cross-sectional view illustrating a weld cross-section in the battery module according to an embodiment of the present invention.

FIG. 9 is another cross-sectional view illustrating a weld cross-section in the battery module according to an embodiment of the present invention;

FIG. 10 is a scanning electron microscope photograph of a weld cross-section manufactured in the battery module according to an exemplary embodiment of the present invention.

DETAILED DESCRIPTION

Hereinafter, a battery module of the present disclosure will be described in detail with reference to the accompanying drawings. The drawings to be provided below are provided by way of example so that the subject matter of the present invention can be sufficiently understood by those skilled in the art. Therefore, the present invention is not limited to the accompanying drawings provided below, but may be modified in many different forms. In addition, the accompanying drawings suggested below will be exaggerated in order to clarify the spirit and scope of the present invention. Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

Also, the singular forms used in the specification and appended claims are intended to include the plural forms as well, unless the context specifically dictates otherwise.

In this specification and the appended claims, terms such as first, second, etc. are used for the purpose of distinguishing one component from another component, not in a limiting sense.

In this specification and the appended claims, the terms "include" or "have" means that a feature or element described in the specification is present, and unless specifically limited, it does not preclude in advance the possibility that one or more other features or components may be added.

As a result of conducting a study to improve a welding strength of a module housing that provides a sealed internal accommodation space in which a plurality of battery cells are accommodated by welding between housing members, the present applicant has found that mechanical properties are greatly affected by a shape of a weld bead in a housing made of an aluminum-based alloy material. In addition, as a result of in-depth research based on these findings, it was found that the mechanical properties of the welded site were improved when the shape of the weld bead, which is the base material (aluminum-based alloy) molten by a laser, satisfies a specific shape. Furthermore, such a specific shape of the weld bead may improve productivity by enabling wider tolerances in dimensions of housing members and an assembly between the housing members, and further, since it may be formed by lower laser energy than conventional housing welding, it was confirmed that the thermal damage of the housing is minimized, thereby completing the present invention.

According to the present invention based on the above-described findings, a battery module includes a housing having an internal accommodation space, and a plurality of battery cells disposed in the internal accommodation space, in which the housing includes a weld joint in which a first base material of a first aluminum-based alloy and a second base material of a second aluminum-based alloy are welded, and at least a partial region of a surface of a bead of the weld joint is located inward with respect to a reference plane, with an imaginary plane, which connects an outer surface of the first base material and an outer surface of the second base material in contact with the weld joint, as the reference plane. In this case, the outer surface of the first base material and the outer surface of the second base material are surfaces that form the outer surface of the housing, and the outer surface of the housing refers to a surface exposed to the outside of the housing, and the inner surface of the housing is an opposite surface to the outer surface and may mean a surface that partitions the internal accommodation space of the housing. Accordingly, the outside may mean the outside of the housing, and the inside may mean the inside (the internal accommodation space) of the housing.

In addition, the reference plane may be a flat plane, and may be a plane connecting a boundary line between the outer surface of the first base material and the weld joint and a boundary line between the outer surface of the second base material and the weld joint. When a reference, a reference plane of a weld cross-section, which is a cross section that traverses the weld joint at a shortest distance from the first base material side to the second base material side, is defined again, it may correspond to a reference line which is a straight line connecting a boundary (defined as a point as it is a two-dimensional cross-section) between the outer surface of the first base material and the weld joint in the weld cross-section; and a boundary (defined as a point as it is a two-dimensional cross-section) between the outer surface of the second base material and the weld joint.

Accordingly, the battery module according to the present invention includes a weld joint at which the first base material of the first aluminum-based alloy and the second base material of the second aluminum-based alloy are welded, and at least a partial region of the surface of the bead of the weld joint is located inward with respect to the reference plane and at least a partial region of the surface of the bead of the weld joint is located inward with respect to the reference line, with the weld cross-section reference which is the cross-section that traverses the weld joint at the shortest distance from the first base material side to the second base material side, the straight line connecting a boundary between the outer surface of the first base material and the weld joint in the weld cross-section and a boundary between the outer surface of the second base material and the weld joint as the reference line.

FIG. 1 is a cross-sectional view illustrating a weld cross-section in a battery module according to an embodiment of the present invention. As in an example illustrated in FIG. 1, a first base material 100 and a second base material 200 of a housing member forming an internal accommodation space in which a plurality of battery cells may be accommodated may be welded by a weld joint 300. In this case, the weld joint 300 may correspond to a metal in which the first base material 100 and the second base material 200 are molten and solidified, specifically, an aluminum-based alloy bead (welding bead). In detail, the weld joint 300 may be the aluminum-based alloy bead in which the first base material 100 and the second base material 200 are molten and solidified by the laser irradiated to the welding target region between the first base material 100 and the second base material 200.

As an example illustrated in FIG. 1, by using, a reference line (RL, illustrated as a dot line), a straight line connecting a boundary p1 between the weld joint 300 and an outer surface of the first base material 100, and a boundary p2 between the weld joint 300 and an outer surface of the second base material 200 with respect a weld cross-section, at least a partial region of the surface of the bead of the weld joint 300 may be located inward with respect to the reference line RL.

The example of FIG. 1 corresponds to an example in which the outer surface of the first base material 100 and the outer surface of the second base material 200 in contact with the weld joint 300 are located on the same plane, but the present invention is not limited thereto.

That is, in the housing according to one specific embodiment of the present invention, the surface of the bead of the weld joint may include a concave region concavely recessed with respect to the reference line RL, on the weld cross-section.

In one embodiment, the weld joint may satisfy the following Equation 1.

$$0.10 \leq h/w \leq 0.30 \quad \text{(Equation 1)}$$

In Equation 1, w denotes a size of a straight line in the weld cross-section, and h denotes a shortest distance between a lowest point in a region of the surface of the bead located inward with respect to the straight line on the weld cross-section and the reference line. In this case, w, which is the size of the reference line, may correspond to a width (maximum width) of the weld bead, and h may correspond to a depth (maximum depth) of the concave region.

FIG. 2 is a cross-sectional view illustrating w and h on a weld cross-section in a battery module according to an embodiment of the present invention. As in the example illustrated in FIG. 2, w may correspond to a length of the reference line (RL), h is a shortest distance between a lowest point (illustrated by a point) in the region of the surface of bead located inward with respect to the reference line (RL) and the reference lines (RL).

The surface of the bead may include one or more concave regions, and an example of FIG. 2 is an example in which the bead surface has two concave regions. When two or more concave regions exist on the bead surface, h may correspond to a larger value among the shortest distances between the lowest points and the reference line for each concave region.

Experimentally, using a contour and a reference line corresponding to the surface of the bead on a microstructure observation photograph of the weld cross-section, the outer side is defined as an upper portion and the inner side is defined as a lower portion. When the weld cross-section protrudes upward beyond the reference line, the weld cross-section is set to a + value, and when the weld cross-section is concave to a lower portion below the reference line, the weld cross-section is set to a − value. In the data set in which the shortest distance between the reference line and one point of the contour is measured according to the contour, the smallest value (the largest absolute value) among the − values may correspond to h. In this case, the microstructure observation photograph may be a scanning electron microscope photograph, but any observation method is sufficient as long as the surface of the bead and the base material may be clearly observed. In addition, the weld cross-section may correspond to a plane perpendicular to the welding direction (welding direction, laser traveling direction).

As described above, h/w of the weld joint may satisfy 0.10 to 0.30, specifically, 0.10 to 0.25, 0.10 to 0.20, or 0.12 to 0.18. When the weld bead formed by melting the aluminum-based alloy base material has a shape satisfying a range of h/w described above, the mechanical strength of the weld joint may be improved.

In one specific embodiment, with respect to the weld cross-section, the weld joint may satisfy Equation 2 below, and when Equation 2 below is satisfied, the weld bead may be interpreted as having a significantly concave region so that mechanical strength can be improved by its shape.

$$0.2 \leq w(\text{conc})/w \leq 1.0 \quad \text{(Equation 2)}$$

In Equation 2, w is the size of the reference line, and w(conc) is a total length of a sum of the length(s) of the reference line region where the weld bead surface is located below the reference line.

FIG. 3 is a cross-sectional view illustrating w and w(conc) on a weld cross-section in a battery module according to an embodiment of the present invention. Examples of the case where the surface of the weld bead on the weld cross-section includes two or more concave regions (two concave regions as in part (a) of FIG. 3), the case where it includes one concave region but also includes a convex region (see part (b) of FIG. 3), and the case where the entire weld bead surface is a concave region (see part(c) of FIG. 3) are illustrated.

As in the example illustrated in FIG. 3, w(conc) is the length (total length) of the reference line region in which the concave region is located below the reference line of the weld cross-section. When two or more concave regions exist as illustrated in part (a) of FIG. 3, w(conc) is the sum of the lengths of the reference line regions where each concave region is located below the reference line, that is, the sum of w1 and w2. Part (c) of FIG. 3 corresponds to an example in which w(conc)/w=1.

As described above, in order for the shape of the weld joint to significantly affect the mechanical properties of the welded region, at least w(conc)/w may be 0.20 or more, preferably 0.25 or more, more preferably 0.30 or more, and even more preferably 0.35 or more, and w(conc)/w may be substantially 1.00 or less. In particular, w(conc)/w in the range of 0.30 to 1.00 is more advantageous because the mechanical properties of the welded region may be further improved.

In one embodiment, with respect to the weld cross-section, the weld joint may satisfy the following Equation 3.

$$0.7t \leq w \leq 2t \quad \text{(Equation 3)}$$

In Equation 3, w is the size of the reference line in the weld cross-section, and t is the thinner of the thicknesses of the first base material and the second base material. In this case, the thickness of the first base material may correspond to a separation distance (shortest separation distance) between the outer surface of the first base material and the opposite surface (inner surface) of the outer surface in the region of the first base material adjacent to the weld joint, and the thickness of the second base material may correspond to the separation distance (shortest separation distance) between the outer surface of the second base material and the opposite surface (inner surface) of the outer surface in the region of the second base material adjacent to the weld joint. In detailing the thickness-related contents of the base material, it is assumed that the thickness of the second base material is smaller (thinner) among the thickness of the first base material and the thickness of the second base material (t=thickness of the second base material), but, conversely, even when the thickness of the first base material is smaller than the thickness of the second base material (t=thickness of the first base material), the above description may be equally applied.

As in Equation 3, w may be 0.7t to 2.0t, and specifically, w may be 0.7t to 1.8t, 0.7t to 1.6t, 0.7t to 1.4t, 0.7t to 1.2t, or 0.7t to 1.2t. The relationship between w and t in Equation 3 means that the region molten by the laser irradiation is very narrow, and it means that the thermal damage to the base material (the first base material and the second base material) by the laser is minimized.

In one specific embodiment, with respect to the weld cross-section, the weld joint may satisfy the following Equation 4.

$$0 < h \leq 0.25t \quad \text{(Equation 4)}$$

In Equation 4, h denotes the same as defined in Equation 1, and t denotes the thinner of the thicknesses of the first base material and the second base material, and denotes the thickness of the second base material according to an example.

The mechanical properties can be significantly affected by the shape of the weld bead, and furthermore, h may be 0.05t to 0.25t, preferably 0.07t to 0.25t, more preferably 0.09t to 0.25t, and still more preferably 0.10t to 0.25t so that the mechanical properties can be improved.

In the battery module according to an embodiment, the weld joint of the housing may satisfy at least one, preferably two or more, more preferably three or more, most preferably all of Equation 1, 2, 3 and 4.

In one embodiment, the penetration depth of the bead in the weld joint may be greater than or equal to a thinner thickness (t, for example, the thickness of the second base material) of the thicknesses of the first base material and the second base material. That is, the bead may be penetrated so as to penetrate the opposite surfaces between the first base material and the second base material. As a specific example, when the penetration depth of the bead is D, and the thinner thickness of the thicknesses of the first base material and the second base material is t, D may be greater than or equal to t, and more specifically, D may be at a level of 1t to 1.3t.

In the battery module according to an example, the penetration depth of the bead in the weld joint of the housing is greater than or equal to the thinner thickness (t, for example, the thickness of the second base material) of the thicknesses of the first base material and the second base material, and at the same time, may satisfy each of Equations 1 to 4 described above, or a combination thereof, or most advantageously all of Equations 1 to 4.

As is known, in general, the welding of the secondary battery housing brings together the housing members, which are coupled to each other to provide a sealed internal accommodation space, into close contact, and the welding is performed by irradiating a laser so that the molten metal (material of the housing member) is penetrated through the housing members. It is common to manufacture the weld bead in a shape protruding out of the housing through such conventional welding. In addition, such conventional welding (hereinafter, referred to as reference welding), that is, the welding to form the weld bead that penetrates through the housing member in the maximum close contact between the welding surfaces is accepted as the most advantageous for the mechanical strength of the welding region.

However, according to an embodiment of the present invention, in the weld joint of the housing, the penetration depth of the bead is greater than or equal to the thinner thickness (t, for example, the thickness of the second base material) of the thicknesses of the first base material and the second base material, and at the same time, when at least one of Equations 1 to 4, or a combination thereof, or most advantageously all of Equations 1 through 4 are satisfied, the weld joint may exhibit improved mechanical strength over the welding region welded by the reference welding. In detail, when D is at a level of 1t to 1.3t and at the same time and satisfies all of Equations 1 to 4, the strength of the welded site may be 1.2 or more when the strength of the welded site obtained by standard welding is set to 1.

FIG. 4 is a diagram illustrating a process diagram of laser welding between the housing members. As illustrated in FIG. 4, the above-described weld joint aligns the first base material 100 and the second base material 200 to form a gap 400 by spacing the welding surfaces 111 and 222 apart without bringing welding surfaces 111 and 222 of the first base material 100 and the second base material 200 as the housing member(s), which are the welding objects and are coupled with each other to (at least partially) form the sealed internal accommodation space, into close contact with each other, and may be formed by filling the gap 400 with the base metal (molten metal) molten by a laser L and penetrating the gap 400 by irradiating the laser L to the welded site where the gap 400 between the first base material 100 and the second base material 200 aligned from the outside is formed. In this case, the first base material 100 and the second base material 200 may be aligned so that their outer surfaces are located on the same plane (imaginary plane), but the gap is formed. By controlling one or more factors selected from a size (x) of the gap, a power of the irradiated laser, and a welding speed (for example, a moving speed of the laser moving along the designed welded site), a shape of the weld bead may be controlled. In detail, among process variables such as the power of the irradiated laser or the welding speed, the specific irradiation method of the laser, and the separation distance (the size of the gap (x)), which is the separation distance between the welding surfaces of two base materials, may mainly affect the shape of the weld bead. The size (x) of the gap is based on t of the thinner thickness (t, for example, the thickness of the second base material) of the thicknesses of the first base material and the second base material, and the size (x) of the gap may satisfy $0 < x \leq 0.30t$, advantageously, $0.05t \leq x \leq 0.30t$, and more advantageously, $0.05t \leq x \leq 0.20t$. As is known, in the typical aluminum-based module housing, the thickness t of the housing wall is at a level of 0.5 mm to 5 mm, more specifically a level of 0.5 to 2 mm.

As described above, the shape of the welding bead may be controlled by one or more process factors selected from the size of the gap, the power of the irradiated laser, the welding speed, and the like. The shape of the weld bead is not very sensitively changed by other process factors such as the power or welding speed as long as it has the above-described level of gap size (separation distance between the two welding surfaces) during the welding.

The formation of such a gap means that the tolerances of the dimensions of the designed and actually manufactured housing members and the allowable tolerances in the assembly between the housing members may be greatly reduced, which means that that the highly precise dimension control of the housing member and the assembly between the highly precise housing members during welding are unnecessary. Thereby, the housing of more uniform quality may be produced, and the productivity may be greatly improved.

In addition, due to the gap between the welding surfaces, the welding bead may be located by penetrating through the housing member even by irradiation of a laser having a lower energy. Accordingly, it is possible to minimize the thermal damage to the housing during the welding, and furthermore, the battery cell located in the internal accommodation space of the housing may also be free from the risk of the thermal damage. In this case, as in the example illustrated on the left side in FIG. 4, the laser L may be irradiated obliquely with respect to the central axis (the axis in the thickness direction of the base material) of the gap. Or, as in the example illustrated on the right side in FIG. 4, the laser L may be irradiated parallel to the central axis of the gap. However, it is possible to prevent the laser from being irradiated directly into the housing through the gap by the inclined laser irradiation, and the welding process of the weld site can be checked with the naked eye, thereby enabling the improvement of the production speed of the battery module. In addition, during the inclined irradiation, the laser is repeatedly irradiated in a circular shape and may move along the desired welded site. The base material around the gap may be uniformly melted through a wobble type welding in which a circle is repeated and overlapped, and the stability of the battery module manufacturing process can be improved during the welding process.

In addition, as in the example illustrated in FIG. 5, a base material having the thinner thickness is regarded as the second base material 200, and the welding end of the second base material 200 may include a protrusion 210 protruding in a tapered shape in which the width becomes narrower in the thickness direction of the second base material as it approaches the first base material 100 side. Diagram (a) of FIG. 5 is an example illustrating the protrusion 210 in the form of a triangular cross-section that traverses the gap-formed welded site at the shortest distance from the first base material side 100 to the second base material side 200 and diagram (b) of FIG. 5 is an example illustrating the protrusion 210 in a rectangular shape (for example, trapezoid), the width of which is narrower as it approaches the side of the first base material 100 based on the same cross-section. In this case, one protruding end of the protrusion 210 may be in contact with the first base material 100. This protrusion 210 is advantageous because it can prevent the laser from directly flowing into the inside (internal accommodation space) of the module when the laser is irradiated to the central axis (the axis in the thickness direction of the base material) of the gap, and it is advantageous because it is possible to form a preset gap size (x) by aligning the first base material 100 and the second base material 200 so that only the welding surface of the first base material 100 and one end of the protrusion 210 of the second base material 200 contact each other without a high degree of alignment between the first base material 100 and the second base material 200. However, the protrusion is not necessarily limited to an angled (polygonal) shape such as a square or triangular based on a cross-section, and a semicircle or a truncated oval shape may also be used, as in an example illustrated in diagram (C) of FIG. 5.

As described above, when the protrusion 210 is formed at one end of the second base material 200 to be welded, the protruding length of the protrusion 210 may correspond to the preset gap size (x). In addition, as illustrated in the examples of FIG. 5, when the protrusion 210 is formed, the gap size (x) may correspond to the separation distance between the outer surface of the first base material 100 and the outer surface of the second base material 200 at the welded site.

When the base material (the first base material 100 and the second base material 200) is an aluminum-based alloy, as a specific example of the laser welding conditions irradiated to the first base material and the second base material arranged to form a gap and spaced apart from each other as described above, an example in which laser linear intensity (LII) obtained by dividing laser power (W) by welding speed (mm/sec) is 30 to 45 J/mm is given, but is not necessarily limited thereto.

In the above-described manufacturing method aspect, the battery module according to an specific embodiment of the present invention includes the weld joint to which the first base material of the first aluminum-based alloy and the second base material of the second aluminum-based alloy are welded, and the weld joint may include a concave region in which a laser is applied to the welded site in which the gap is formed on the outside of the housing, and the surface of the weld bead is concavely recessed in a state in which the first base material and the second base material are aligned (assembled) so that the welding surfaces of the first base material and the second base material are spaced apart from each other to have the gap.

The first aluminum-based alloy of the first base material and the second aluminum-based alloy are independent of each other and may be an Al—Mg-based solid-solution hardening aluminum alloy or an Al—Mg—Si-based precipitation hardening aluminum alloy. Specifically, both the first base material and the second base material may be the Al—Mg-based solid-solution hardening aluminum alloy, or either of the first base material and the second base material may be the Al—Mg-based solid-solution hardening aluminum alloy while the other may be the Al—Mg—Si-based precipitation hardening aluminum alloy. As a practical example, the Al—Mg-based solid-solution hardening type aluminum alloy may be an A15000 series aluminum alloy, and the Al—Mg—Si-based precipitation hardening type aluminum alloy may be an A16000 series aluminum alloy, but the aluminum alloy is not necessarily limited to an A15000 series or A16000 series.

The shape of the first base material and the second base material may be a shape in which all or part of the designed shape can be realized by assembling the housing member (s) that are the first base material and the second base material, depending on the desired designed shape of the housing.

For example, each of the first base material and the second base material may be in the shape of a rectangular plate or a rectangular plate in which one or both ends are vertically bent, and the shape of the housing designed by assembling one or more rectangular plates and/or one or two or more bent rectangular plates may be implemented.

As a practical example, the housing may have a rectangular parallelepiped shape, and by setting one axis direction to front/back, the other axis direction to left/right, and the remaining other axis direction to up/down in three axes orthogonal to each other, two rectangular plates with both bent ends are assembled so that the bent ends are coupled to each other, and thus, the upper/lower and left/right clocked spaces are partitioned, and each of the two rectangular plates may be assembled to close the opening of the assembled two bent rectangular plates, and thus, the sealed internal accommodation space of which the front/rear is closed may be formed.

As another practical example, the housing may have a rectangular parallelepiped shape, and by setting one axis direction to front/back, the other axis direction to left/right, and the remaining other axis direction to up/down in three axes orthogonal to each other, one rectangular plate with both bent ends is assembled so that the rectangular plate is coupled to both ends not bent, and thus, the front/rear and left/right blocked spaces are partitioned, and the one rectangular plates may be assembled to close the upper or lower opening of the opened rectangular plate, and thus, the sealed internal accommodation space may be formed.

In this case, the assembly by coupling between the housing members (rectangular plate, bent rectangular plate) may mean binding between the housing members by welding. When there is more than one welded site (welding line) in the housing, at least one welded site may have the shape of the above-described weld joint, and furthermore, all of the welded sites may have the above-described shape of the weld joint.

Substantially, as illustrated in FIG. 6, the housing may include a first housing member 10 in a shape of a bent rectangular plate including a bottom surface and left and right side surfaces integrally connected to the bottom surface; a second housing member 40 having a rectangular plate shape (at least) coupled to the first housing member 10 to form an upper surface facing the bottom surface; and a third housing member 20 and a fourth housing member 30 in a shape of a rectangular plate which are coupled to the first housing member 10 and the second housing members 40 to form front and rear side surfaces, respectively. In this case, the pair of the first base material and the second base material connected to each other by the above-described welding joint may be one or more regions selected from the following i) to v).

i) A region between the first housing member 10 and the second housing member 40;

ii) A region between the first housing member 10 and the third housing member 20;

iii) A region between the first housing member 10 and the fourth housing member 30;

iv) A region between the first housing member 10 to which third housing member 20 and fourth housing member 30 are welded and the second housing member 40; and v) A region between the first housing member 10 to which second housing member 40 and third housing member 20 are welded and fourth housing member 30.

In this case, the welded site of the first housing member 10 welded to the third and fourth housing members 20 and 30 and/or the welded site of the first housing member 10 welded to the second and third housing members 40 and 20 may have the shape of the weld joint described above, but the shape welded by the conventional welding method is not excluded.

Describing in detail as a pair of the welding ends that are welded to each other between each housing member with reference to the exploded perspective view of FIG. 6, the welded site of the first base material and the second base material may be selected from one or more of a U-shaped end 10W1 of the first housing member 10 and lower and both ends 20W1 of the third housing member 20; an upper end 20W2 of the third housing member 20 and one end 40W2 of the second housing member 40; an end 40W3 of the second housing member 40 and a bent end 10W3 of the first housing member 10; the other end 40W4 of the second housing member 40 and the other bent end 10W4 of the first housing member 10; the other U-shaped end 10W6 of the first housing member 10 and the lower and both ends 30W6 of the fourth housing member 30; and the other end 40W5 of the second housing member 40 and the upper end 30W5 of the fourth housing member 30.

In this case, before the internal accommodation space is sealed by the welding coupling between the first to fourth housing members 10 to 40, that is, after the battery cell is charged into the inner space formed by the housing member in a state in which the top or front/rear side is opened, the one opened side may be closed. That is, before coupling of the second housing member 40, the third housing member 20 or the fourth housing member 30, after the plurality of battery cells are loaded into the internal accommodation space, the housing member sealing the one opened side may be welded together.

The thickness of the housing member in the form of the rectangular plate or the bent rectangular plate may range from $10^0$ m to $10^1$ mm. As a practical example, the thickness of the housing member may range from 1 mm to 30 mm, but is not necessarily limited thereto.

FIG. 7 is a cross-sectional view of a battery module including a housing 1000 having an internal accommodation space formed by welding the coupling of housing members and a plurality of battery cells 2000 accommodated in an internal accommodation space of the housing 1000. A region indicated by a dotted circle in FIG. 7 may correspond to a welded region (weld joint) between the one end 40W4 of the second housing member 40 and the bent one end 10W4 of the first housing member 10 in FIG. 6, and an enlarged view of the region indicated by the dotted circle is illustrated on the right of FIG. 6. Using the second housing member 40 having a relatively thin thickness as the second base material 200 and the first housing member 10 as the first base material 100, the first base material 100 and the second base material 200 are aligned to form the gap between the first base material 100 and the second base material 200, and are irradiated with a laser to be welded, so the housing 1000 may have a weld joint 300 having a weld bead concavely recessed into the inside compared to the outer surface of the base materials 100 and 200.

In an embodiment of the present invention, the first base material may be thicker than the second base material. The first base material may further include ribs protruding toward the second base material, in which the rib may be located entirely or at least partially spaced apart from the opposite side of the outer surface of the second base material. The first base material including the ribs will be illustrated below.

FIGS. 8 and 9 are cross-sectional views illustrating a structure in which a rib 110 is formed in the first base material 100 on a weld cross-section in a battery module according to an embodiment of the present invention. As in the example illustrated in FIG. 8, the rib 110 may be located entirely spaced apart from the opposite surface of the outer surface of the second base material 200. Alternatively, as in the example shown in FIG. 9, the rib 110 may be located partially spaced apart from the opposite surface of the outer surface of the second base material 200.

As in the example of FIGS. 8 and 9, by the rib 110 extending from the first base material 100 and protruding toward the second base material 200 to be located inside the second base material 200, when welding by laser irradiation, it is possible to prevent the laser from being irradiated into the internal accommodation space of the housing through the gap formed between the welding surfaces. Furthermore, the rib 110 may serve to prevent the aluminum alloy melt flowing through the welding initial gap from flowing into the internal accommodation space.

The rib 110 advantageously has a curved surface that faces the opposite surface of the outer surface of the second base material 200 as in an example of FIG. 9, and the curved surface preferably includes a concave surface 114 located on the welding surface side of the first base material 100 and a convex surface 112 located on the opposite side of the welding surface side of the first base material 100.

The rib 110 may be in contact with the second base material 200 through the convex surface 112, thereby aligning and fixing the first base material 100 and the second base material 200 easily and stably during laser welding and accommodating the aluminum alloy melt flowing through the welding initial gap by the hollow space formed by the concave surface 114. In this case, the concave depth of the concave surface may be 0.1t to 0.3t based on the thickness t of the thinner base material of the two base materials, but is not necessarily limited thereto.

As described above, the rib 110 having a curved surface including the concave surface 114 and the convex surface 112 may contact the second base material 200 on the convex surface 112, and the welding bead 300 may partially or entirely fill the hollow space between the opposite surface of the outer surface of the second base material 200 and the concave surface 114 of the rib 110, and advantageously fill at least 20% of the hollow space, more advantageously 40% or more, and even more advantageously from 50% to 100%. As the aluminum alloy melt is accommodated in the hollow space provided by the concave surface 114 and the weld bead is filled, the welding strength between the first base material 100 and the second base material 200 can be further improved.

The battery cell may be a prismatic battery cell or a pouch-type battery cell, and the battery cell may be located in the internal accommodation space of the housing. The number of battery cells accommodated in the internal accommodation space is controlled by the use of the battery module without being particularly limited. The battery cells accommodated in the internal accommodation space may be electrically connected to each other.

The battery module may further include a conventional fixing member for fixing the plurality of battery cells to the inner accommodation space of the housing or a conventional heat transfer member for transferring heat generated from the battery cells to the outside of the housing, but it goes without saying that the present invention cannot be limited by the presence or absence of a fixing member, a specific structure of fixing member, the presence or absence of a cooling unit including a heat transfer member, the specific structure of heat transfer member, the material, or the like.

FIG. 10 is a scanning electron microscope photograph of a weld cross-section according to an embodiment of the present invention, and illustrates the weld cross-section in which the weld joint formed by irradiating a laser (near infrared (NIR laser with a wavelength of 1000 to 1200 nm) with an Laser Linear Intensity (LLI) of 30.8 J/mm is observed after the outer surfaces of the first base material 100 provided with the rib 110 having a concave surface and a convex surface and the second base material 200 are located on the same plane and a gap (about 200 micrometers, 0.14t level) is formed so that the two welding surfaces are spaced apart from each other. In this case, the first base material was an Al5000 series alloy, and the second base material was an Al6000 series alloy. In FIG. 10, the penetration depth (D) of the bead was 1.3t based on the thickness t of the second base material 200, which is a thin base material, h/w=0.16, w(conc)/w=1, w=1.16t, h=0.19t, a filling rate (area filled with beads in the hollow space on the weld cross-section/total area of the empty space provided by the rib before welding*100, %, hereinafter, FF) in which the empty space provided by the rib is filled by the bead practically reached 100%. For comparison, the outer surfaces of the same first base material and second base material were located on the same plane and the two welding surfaces were in close contact with each other, and then NIR laser welding was performed with an LLI of 30.8 J/mm. Thereafter, as a result of measuring the welding strength of the first base material and the second base material welded according to ASTME8/E8M, the welding strength of the weld body having the weld joint according to an embodiment of the present invention as illustrated in FIG. 10 was 29.8 kgf/mm, and the welding strength of the reference weld body, which was welded under the same conditions after bringing the two base materials into close contact with each other as in the prior art, was 25.6 kgf/mm.

In addition, a simple plate-shaped first base material and a second base material without ribs are used, but the outer surfaces of the first base material and the second base material are located on the same plane. The gap is formed so that the two welding surfaces are spaced apart from each other (about 100 micrometers. 0.067t level), and then a laser (NIR laser: 1000 to 1200 nm wavelength) is irradiated with 30.8 J/mm of LLI to perform welding, so the bead is penetrated in the form of penetrating through the thin base material (penetration depth D t), and based on the thickness t of the second base material 200, the bead (weld joint) of h/w=0.15, w(conc)/w=0.52, w=1.14t, and h=0.20t was formed, and the weld strength of the weld body having this weld joint was 28.7 kgf/mm.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

The invention claimed is:

1. A battery module, comprising:
a housing having an internal accommodation space; and a plurality of battery cells disposed in the internal accommodation space,
wherein the housing includes a weld joint in which a first base material and a second base material are welded, and
wherein at least a partial region of a surface of a bead of the weld joint is located inward with respect to a reference plane, with an imaginary plane, which connects an outer surface of the first base material and an outer surface of the second base material in contact with the weld joint, as the reference plane,
wherein the first and second base materials are a first aluminum-based alloy and a second aluminum-based alloy, respectively, and wherein with respect to a weld cross-section, which is a cross-section traversing the weld joint at a shortest distance from the first base material side to the second base material side,
the weld joint satisfies the following Equation 1, $$0.10 \leq h/w \leq 0.30$$

wherein in Equation 1, w denotes a size in mm of a straight line connecting a boundary between the outer surface of the first base material and the weld joint and a boundary between the outer surface of the second base material and the weld joint in the weld cross-section, and h denotes a shortest distance in mm between a lowest point in a region of the bead surface located inward with respect to the straight line on the weld cross-section and the straight line,
wherein the first base material further includes a rib that protrudes toward the second base material and is partially spaced apart from an inner surface of the second base material, the rib opposes the inner surface of the second base material, the rib comprises a concave surface and a convex surface facing the inner surface of the second base material,
wherein the bead of the weld joint has a penetration depth greater than or equal to the thinner of thicknesses of the first base material and the second base material, and entirely fills a hollow space between the inner surface of the second base material and the concave surface of the rib.

2. The battery module of claim 1, wherein
with respect to a weld cross-section, which is a cross-section traversing the weld joint at a shortest distance from the first base material side to the second base material side,
the weld joint satisfies the following Equation 2, $$0.2 \leq w(conc)/w \leq 1.0$$

wherein, in Equation 2, w denotes a size in mm of a straight line connecting a boundary between the outer surface of the first base material and the weld joint and a boundary between the outer surface of the second base material and the weld joint in the weld cross-section, and w(conc) denotes a total length in mm of a sum of lengths of a straight region where the weld bead surface is located at a lower portion of the straight line.

3. The battery module of claim 1, wherein
with respect to a weld cross-section, which is a cross-section traversing the weld joint at a shortest distance from the first base material side to the second base material side, the weld joint satisfies the following Equation 3, $$0.7t \leq w \leq 2t$$

wherein in Equation 3, w denotes a size in mm of a straight line connecting a boundary between the outer surface of the first base material and the weld joint and a boundary between the outer surface of the second base material and the weld joint in the weld cross-section, and t denotes the thinner of thicknesses in mm of the first base material and the second base material.

4. The battery module of claim 1, wherein
with respect to a weld cross-section, which is a cross-section traversing the weld joint at a shortest distance from the first base material side to the second base material side,
the weld joint satisfies the following Equation 4, $$0 < h \leq 0.25t$$

wherein in Equation 4, h denotes a shortest distance in mm between a straight line connecting a boundary between the outer surface of the first base material and the weld joint in the weld cross-section and a boundary between the outer surface of the second base material and the weld joint and a lowest point in a region of the bead surface located inward with respect to the straight line on the weld cross-section, and t denotes the thinner of thicknesses in mm of the first base material and the second base material.

5. The battery module of claim 1, wherein
the outer surface of the first base material and the outer surface of the second base material are located on the same plane.

6. The battery module of claim 1, wherein
the first base material and the second base material each have a shape of a rectangular plate or a bent rectangular plate in which one or both ends are vertically bent.

7. The battery module of claim 6, wherein
the housing includes a first housing member in a shape of a bent rectangular plate including a bottom surface and integrally connected to a bottom surface to form left/right side surfaces; a second housing member having a rectangular plate shape coupled to the first housing member to form an upper surface facing the bottom surface; and third and fourth housing members in a shape of a rectangular plate which are coupled to the first and second housing members to form front and rear two side surfaces, and a pair of the first base material and the second base material connected to each other by the weld joint is at least one region selected from the following i) to v),
i) a region between the first housing member and the second housing member
ii) a region between the first housing member and the third housing member
iii) a region between the first housing member and the fourth housing member
iv) a region between the first housing member welded to the third and fourth housing members and the second housing member
v) a region between the first housing member welded to the second and third housing members and the fourth housing member.

8. The battery module of claim 1, wherein
the first aluminum-based alloy and the second aluminum-based alloy are independent of each other and are an Al—Mg-based solid-solution hardening aluminum alloy or an Al—Mg—Si-based precipitation hardening aluminum alloy.

9. The battery module of claim 1, wherein the concave surface is spaced from the inner surface of the second base material and the convex surface contacts the inner surface of the second base material.

10. The battery module of claim 1, wherein the first base material is thicker than the second base material.

11. A method of manufacturing a battery module, comprising:
a) aligning a first base material and a second base material so that the first and second base materials are spaced apart from each other to form a gap between the first and second base materials and so that welding surfaces of the first base material and the second base material which are welding targets and are coupled to each other to form a housing member forming an internal accommodation space in which a plurality of battery cells are accommodated; and
b) welding the first base material and the second base material by irradiating a laser to a welded site where the gap is formed,
wherein the first and second base materials are a first aluminum-based alloy and a second aluminum-based alloy, respectively, and wherein with respect to a weld cross-section, which is a cross-section traversing the weld joint at a shortest distance from the first base material side to the second base material side,
the weld joint satisfies the following Equation 1, $$0.10 \leq h/w \leq 0.30$$

wherein in Equation 1, w denotes a size in mm of a straight line connecting a boundary between the outer surface of the first base material and the weld joint and a boundary between the outer surface of the second base material and the weld joint in the weld cross-section, and h denotes a shortest distance in mm between a lowest point in a region of the bead surface located inward with respect to the straight line on the weld cross-section and the straight line,
wherein the first base material further includes a rib that protrudes toward the second base material and is partially spaced apart from an inner surface of the second base material, the rib opposes the inner surface of the second base material, the rib comprises a concave surface and a convex surface facing the inner surface of the second base material, wherein the bead of the weld joint has a penetration depth greater than or equal to the thinner of thicknesses of the first base material and the second base material, and entirely fills a hollow space between the inner surface of the second base material and the concave surface of the rib.

12. The method of claim 11, wherein
in step a), a size x of the gap is greater than 0 and less than or equal to 0.3t, based on t which is the thinner of thicknesses of the first base material and the second base material.

13. The method of claim 11, wherein
a welded end of the second base material includes a protrusion protruding in a tapered shape that becomes narrower as the welded end approaches the first base material, wherein the second base material is thinner than the first base material.

14. The method of claim 13, wherein
the protrusion has a shape of a polygon including a rectangle or a triangle, a semicircle, or a truncated oval, with respect to a cross-section that traverses the welded site at a shortest distance from the first base material side to the second base material side.

15. The method of claim 11, wherein
the laser is a near-infrared laser.

16. The method of claim 11, wherein
a ratio of the irradiated laser power (W) divided by a welding speed (mm/sec) is 30 to 45 J/mm.

17. A method of manufacturing a battery module, comprising:
positioning a welding surface of a first base material with a welding surface of a second base material to be adjacent to each other but spaced apart with a gap formed therebetween; and
welding the first and second base materials by irradiating a laser to form a housing for a plurality of battery cells,
wherein the first base material further includes a rib that protrudes toward the second base material and is partially spaced apart from an inner surface of the second base material, the rib opposes the inner surface of the second base material, the rib comprises a concave surface and a convex surface facing the inner surface of the second base material,
wherein the bead of the weld joint has a penetration depth greater than or equal to the thinner of thicknesses of the first base material and the second base material, and entirely fills a hollow space between the inner surface of the second base material and the concave surface of the rib.

* * * * *